C. W. SHAW.
BRAKE FOR AEROPLANES.
APPLICATION FILED MAY 19, 1920.
1,360,454.
Patented Nov. 30, 1920.
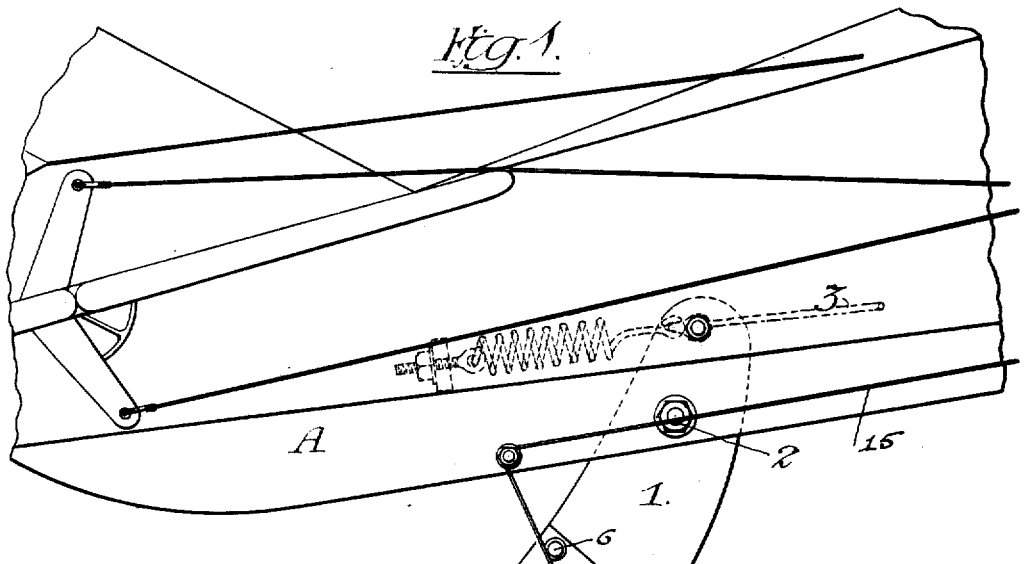
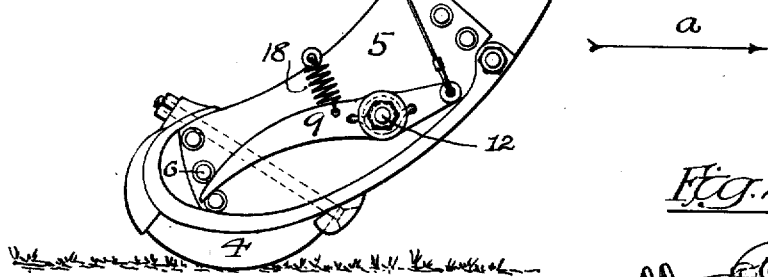
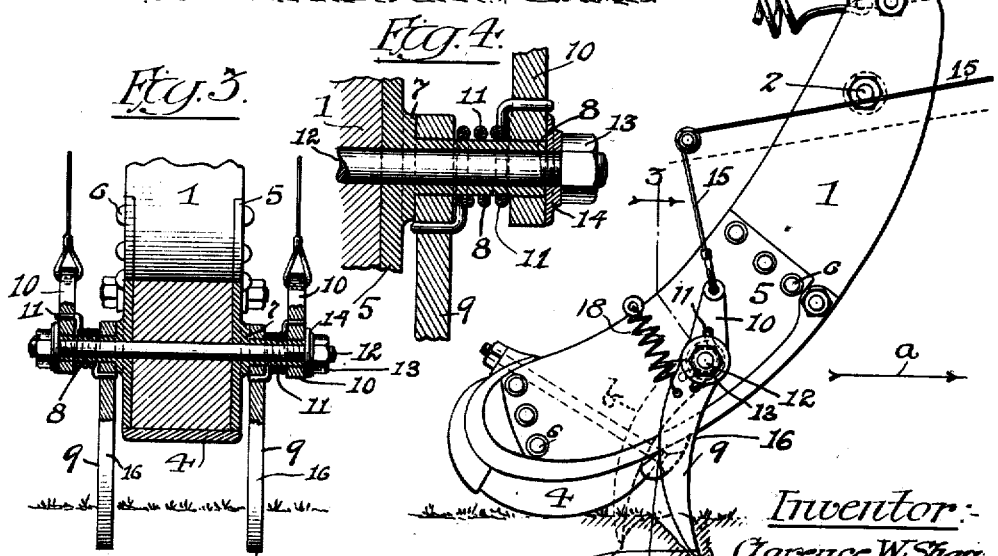
Inventor:-
Clarence W. Shaw

UNITED STATES PATENT OFFICE.

CLARENCE W. SHAW, OF CHICAGO, ILLINOIS.

BRAKE FOR AEROPLANES.

1,360,454.   Specification of Letters Patent.   Patented Nov. 30, 1920.

Application filed May 19, 1920. Serial No. 382,589.

*To all whom it may concern:*

Be it known that I, CLARENCE W. SHAW, a citizen of the United States, residing at Chicago, in the county of Cook and State of Illinois, have invented certain new and useful Improvements in Brakes for Aeroplanes, of which the following is a specification, reference being had to the accompanying drawings, and to the reference characters marked thereon, which form a part of this specification.

This invention relates to brake devices for use upon aeroplanes, and more particularly to that type of planes which carry a skid upon the tail of the plane.

One object of the invention is to provide a braking means which may be easily put into operation so as to effectively check the progress of the machine when landing.

Another object is to provide such braking means with a yielding part or parts so that said part when encountering an obstruction such as a stone will automatically yield sufficiently to pass the same without requiring the operator to actuate the rod or other control which had been set to originally put the braking means into operative position.

These and other objects and advantages will be more fully comprehended as I proceed with a description of my invention, which consists of the devices and combination of devices hereinafter illustrated, described and claimed.

In the accompanying drawings,

Figure 1 is a side elevation of a portion of the tail of an aeroplane with my invention applied to the tail skid.

Fig. 2 is a similar view of the tail skid, detached, to illustrate my invention in action.

Fig. 3 is a vertical, transverse, sectional view taken on the plane indicated by the line 3—3 of Fig. 2.

Fig. 4 is a sectional, detail view, enlarged to show more clearly the construction illustrated in Fig. 3.

By reference to said drawings, it will be seen that A indicates, as a whole, any conventional or special type of the tail of an aeroplane to which is applied a movable skid 1. The latter may be secured to the former in any suitable manner, as, for example, by nut and bolt as indicated at 2; and when so pivotally secured, may be controlled from the fuselage of the machine by an operating wire 3. The skid 1 will also preferably, be provided with a friction brake surface 4 at its lower end, which is adapted to contact with the ground in a familiar manner.

My improved brake device will be applied, preferably, in two units,—one on each side of the skid 1, where the plane is provided with a skid, but it will be understood that it may be as readily and effectively, applied to the tail or other appropriate portion of other types of aeroplanes, such for example, as those having a landing frame.

I will describe one of said units, as applied to a metal plate 5, which latter is fastened by screws 6 or other means to the side face of the skid. Upon the plate 5 is a short boss 7, from which a sleeve or tubular member 8 projects outwardly, shown herein as integral with the said boss. Loosely mounted upon the sleeve 8 and resting against the face of the boss 7, is a downwardly extending arm or brake fluke 9. Similarly mounted upon the outer end of the sleeve is an upwardly extending arm 10, preferably somewhat shorter than the fluke 9. Intermediate the brake fluke 9 and the arm 10 is a coiled spring 11, which is wrapped about the sleeve 8, with one of its ends secured to the brake 9, and the other end to the arm 10. A bolt 12 with a lock nut 13 and washer 14 will hold the parts in operative relation. When both sides of the skid are supplied with the parts just described, but one bolt 12 will preferably be employed and the same may extend transversely through the skid, as illustrated in Fig. 3.

An operating wire 15 secured at one end to the arm 10 will lead to the fuselage, convenient for the aviator to use. The brake fluke 9 may be somewhat tapered toward its lower end and the under margin 16 is preferably concave, so as to make the end 17 more or less pointed, thereby enabling it, the more readily, to enter the surface of the ground. When the machine is in flight, the arm 10 and brake 9 will be in the positions illustrated in Fig. 1,—that is to say, the brake will be alongside the skid 1 and above the horizontal plane of the earth contacting surface 4; while in use, while landing, the brake will be swung so that its end will depend below the skid surface 4.

When it is desired to put my braking device into use to assist the skid, or to provide additional friction brake or earth contacting points, the wire 15 will be operated by the aviator, thereby actuating the arm 10 and causing said arm to rock upon the sleeve 7 as a pivot. This movement of the arm 10 will, through the medium of the relatively stiff coiled spring 11, cause a similar pivotal movement of the brake 9, thereby throwing its lower end 17 downwardly, see Fig. 2, below the contacting surface 4 of the skid. Said end of the brake fluke will then be in position to contact with or even dig into the ground, as the aeroplane moves along, in the direction of the arrow $a$.

Should a stone or other obstruction lie in the path of the moving aeroplane and be struck by the brake 9, as illustrated at 18 in Fig. 2, the brake 9 will automatically rock or swing about the sleeve as a fulcrum to clear said obstruction, the spring 11 permitting this yielding pivotal movement. This action is indicated by dotted lines $b$ in Fig. 2. The tension of the spring will, automatically, cause the brake 9 to resume its normal position as shown in full lines in said Fig. 2, immediately upon passing the obstruction. A spring 18 secured to the skid and to the brake, will return the latter to normal position.

Thus it will be seen that the brake 9 is controlled or operated to its raised position (Fig. 1) by the spring 18, and that it is manually actuated by the wire 15, to its operating position (Fig. 2); while it is automatically operated by an unyielding stone or obstruction, with which it may contact, so as to tilt or slide over said obstruction; and further, it will be obvious that as soon as the obstruction is passed, the fluke brake 9 will automatically return to the normal. It will also be manifest that this yielding movement will not change the position of the upper arm 10 and its control rod or wire, which without any resilient or yielding means, would cause a severe jar or sudden checking effect, or cause damage to the plane, both of which it is desirable to avoid.

It will be understood that changes in mechanical details may be made in applying my improved braking means to aeroplanes, without departing from the principle of my invention. For example, while I have shown two units, one on each side of the skid, manifestly one only may be used. Also, that the control wire 15 will be branched, preferably, near the skid so that both arms 10, 10, will be simultaneously actuated by the wire 15.

It will also be understood that my invention may be applied equally upon planes which are not provided with a skid or other brake or guide member.

While I recommend the form illustrated as a desirable mechanism, I do not wish my invention to be limited to the details of construction illustrated and described, except as such details may be made the subject of specific claims.

I claim as my invention:

1. A braking mechanism for aeroplanes comprising in combination a tail or other brake support, a fulcrum member, an arm and a brake fluke, each pivotally mounted upon said fulcrum member, an operative connection between said arm and fluke permitting of relative motion between them and actuating means attached to the arm.

2. A braking mechanism for aeroplanes comprising in combination a tail or other brake support, a fulcrum member, an arm and a brake fluke, each pivotally mounted upon said fulcrum member, an operative connection between said arm and fluke permitting of relative motion between them and actuating means attached to the arm, said operative connection including a spring.

3. A braking mechanism for aeroplanes comprising in combination a tail or other brake support, a fulcrum member, an arm and a brake fluke, each pivotally mounted upon said fulcrum member, an operative connection between said arm and fluke permitting of relative motion between them and actuating means attached to the arm, said operative connection including a spring connected at one end to the arm and at the other to the fluke.

4. A braking mechanism for aeroplanes comprising in combination a sleeve fulcrum member, an arm loosely mounted thereon, a fluke member similarly mounted, a spring coiled about the fulcrum intermediate said arm and said fluke and connected to both, and means for actuating same arm.

5. A braking mechanism for aeroplanes comprising in combination a tail or other brake support, a fulcrum member, an arm and a brake fluke, each pivotally mounted upon said fulcrum member, an operative connection between said arm and fluke permitting of relative motion between them and actuating means attached to the arm, said operative connection including a spring; said fulcrum being located above the earth contacting surface of said tail or support and the brake fluke adapted to rock or tilt to bring its end below said surface.

6. A brake mechanism for aeroplanes comprising a skid, a fulcrum secured thereto, two members pivotally mounted upon said fulcrum, means connecting said pivoted members and providing for relative movement between said members, and an actuating rod associated with one of said members.

7. A brake mechanism for aeroplanes comprising a skid, a fulcrum secured thereto, two members pivotally mounted upon said fulcrum, means connecting said pivoted members and providing for relative movement between said members, and an actuating rod associated with one of said members, said connecting means including a spring.

8. A brake mechanism for aeroplanes comprising a skid, a fulcrum secured thereto, two members pivotally mounted upon said fulcrum, means connecting said pivoted members and providing for relative movement between said members, and an actuating rod associated with one of said members, said connecting means including a spring coiled about the fulcrum intermediate said two pivoted members and attached to each.

9. A brake mechanism for aeroplanes comprising a skid, a fulcrum secured thereto, two members pivotally mounted upon said fulcrum, means connecting said pivoted members and providing for relative movement between said members, and an actuating rod associated with one of said members, one of said pivoted members having a pointed end.

10. A brake mechanism for aeroplanes comprising a skid, a fulcrum secured thereto, two members pivotally mounted upon said fulcrum, means connecting said pivoted members and providing for relative movement between said members, and an actuating rod associated with one of said members, one of said pivoted members having a pointed end and said actuating rod being connected to the other pivoted member.

11. A brake mechanism for aeroplanes comprising a support, two members pivotally mounted on the support, means connected to said pivoted members to provide relative movement between them, an actuating rod associated with one of said pivoted members and a resilient connection between the other pivoted member and the support.

12. A brake mechanism for aeroplanes comprising a support, two members pivotally mounted on the support, means connected to said pivoted members to provide relative movement between them, an actuating rod associated with one of said pivoted members and a spring connection between the other pivoted member and the support.

In testimony that I claim the foregoing as my invention I affix my signature, in the presence of two witnesses, this 17th day of May, 1920.

CLARENCE W. SHAW.

Witnesses:
TAYLOR E. BROWN,
B. L. MACGREGOR.